US012749319B2

(12) United States Patent
Krökel et al.

(10) Patent No.: US 12,749,319 B2
(45) Date of Patent: Sep. 29, 2026

(54) METHOD AND DEVICE FOR THE DETECTION AND DETERMINATION OF THE HEIGHT OF OBJECTS

(71) Applicant: Continental Autonomous Mobility Germany GmbH, Ingolstadt (DE)

(72) Inventors: Dieter Krökel, Eriskirch (DE); Jonathan Wache, Bregenz (AT); Stefan Heinrich, Kressbronn (DE); Martin Pfitzer, Lindau (DE); Thomas Fechner, Wasserburg (DE)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 76 days.

(21) Appl. No.: 18/547,028

(22) PCT Filed: Jan. 27, 2022

(86) PCT No.: PCT/DE2022/200009

§ 371 (c)(1),
(2) Date: Aug. 18, 2023

(87) PCT Pub. No.: WO2022/179669

PCT Pub. Date: Sep. 1, 2022

(65) Prior Publication Data

US 2024/0135720 A1 Apr. 25, 2024
US 2024/0233391 A9 Jul. 11, 2024

(30) Foreign Application Priority Data

Feb. 24, 2021 (DE) ..................... 10 2021 201 713.4

(51) Int. Cl.
*G06V 20/56* (2022.01)
*G01S 13/86* (2006.01)
(Continued)

(52) U.S. Cl.
CPC ............ *G06V 20/56* (2022.01); *G01S 13/867* (2013.01); *G01S 17/86* (2020.01); *G06T 7/12* (2017.01);
(Continued)

(58) Field of Classification Search
CPC ...... G06V 20/56; G06V 10/25; G06V 10/761; G06T 7/12; G06T 7/60; G01S 17/86; G01S 13/867
See application file for complete search history.

(56) References Cited

U.S. PATENT DOCUMENTS 10,255,510 B2 4/2019 Yu et al.
2005/0086000 A1 4/2005 Tsuchiya et al.
(Continued)

FOREIGN PATENT DOCUMENTS

CA 3 028 288 A1 12/2019
CN 105849770 A 8/2016
(Continued)

OTHER PUBLICATIONS

Notice of Reasons for Refusal drafted Apr. 23, 2024 and mailed on May 1, 2024 for the counterpart Japanese Patent Application No. 2023-542755 and machine translation of same.
(Continued)

*Primary Examiner* — Rowina J Cattungal
(74) *Attorney, Agent, or Firm* — Buchanan Ingersoll & Rooney PC

(57) ABSTRACT

The present disclosure relates to a method for the detection and determination of the height of objects by means of an environment detection system, including a first environment detection sensor and a second environment detection sensor of a vehicle, wherein at least one of the environment detection sensors is a mono camera. The method includes the following steps: capturing a mono image using the
(Continued)

camera; capturing an environment representation using the second environment detection sensor; carrying out object detection in the mono image; carrying out object detection in the environment representation of the second environment detection sensor; measuring the distance from the object in the environment representation of the second environment detection sensor; and carrying out height determination of the detected object.

10 Claims, 2 Drawing Sheets

(51) Int. Cl.

| | |
|---|---|
| ***G01S 17/86*** | (2020.01) |
| ***G06T 7/12*** | (2017.01) |
| ***G06T 7/60*** | (2017.01) |
| ***G06V 10/25*** | (2022.01) |
| ***G06V 10/74*** | (2022.01) |

(52) U.S. Cl.

CPC ................ *G06T 7/60* (2013.01); *G06V 10/25* (2022.01); *G06V 10/761* (2022.01); *G06V 2201/07* (2022.01)

(56) References Cited

U.S. PATENT DOCUMENTS

| | | | | |
|---|---|---|---|---|
| 2010/0104199 | A1 | 4/2010 | Zhang | |
| 2013/0030685 | A1 | 1/2013 | Goetting | |
| 2016/0275359 | A1 | 9/2016 | Yoshida et al. | |
| 2018/0059679 | A1 | 3/2018 | Taimouri et al. | |
| 2018/0101739 | A1* | 4/2018 | Zhang | G06V 20/58 |
| 2020/0183395 | A1 | 6/2020 | Levandowski et al. | |
| 2021/0026355 | A1 | 1/2021 | Chen et al. | |

FOREIGN PATENT DOCUMENTS

| | | | | |
|---|---|---|---|---|
| DE | 602004011164 | T2 | 12/2008 | |
| DE | 102009050503 | A1 | 11/2010 | |
| DE | 112014005376 | T5 | 8/2016 | |
| DE | 102017120112 | A1 | 3/2018 | |
| DE | 102020007057 | A1 | 1/2021 | |
| EP | 2555014 | B1 | 2/2018 | |
| JP | H07-049999 | A | 2/1995 | |
| JP | H10-222792 | A | 8/1998 | |
| JP | 2010271143 | A * | 12/2010 | |
| JP | 2020528021 | A | 9/2020 | |
| WO | 2015098222 | A1 | 7/2015 | |
| WO | 2020/182564 | A1 | 9/2020 | |
| WO | WO-2022160232 | A1 * | 8/2022 | G06K 9/00805 |

OTHER PUBLICATIONS

Notice of Reasons for Refusal Date: Sep. 24, 2024 for the counterpart Japanese Patent Application No. 2023-542755 and machine translation of same.

German Search Report dated Sep. 29, 2021 for the priority German Patent Application No. 10 2021 201 713.4.

The International Search Report and the Written Opinion of the International Searching Authority mailed on May 4, 2022, for the Application No. PCT/DE2022/200009 from which this application claims priority.

Xiangmo Zhao et al., "Fusion of 3D LIDAR and Camera Data for Object Detection in Autonomous Vehicle Applications", IEEE Sensors Journal vol. 20, No. 9, May 1, 2020, pp. 4901-4913. doi: 10.1109/JSEN.2020.2966034.

Heiko Hirschmüller et al., "Accurate and Efficient Stereo Processing by Semi-Global Matching and Mutual Information", IEEE Conference on Computer Vision and Pattern Recognition (CVPR), Jun. 20-26, 2005; DOI: 10.1109/CVPR.2005.56.

Nikolai Smolyanskiy et al., "On the Importance of Stereo for Accurate Depth Estimation: An Efficient Semi-Supervised Deep Neural Network Approach", 2018 IEEE/CVF Conference on Computer Vision and Pattern Recognition Workshops (CVPRW), 2018, pp. 1120-11208, DOI Bookmark: 10.1109/CVPRW.2018.00147.

D. Krökel et al., "Camera Based Lost Cargo Detection for Automated Driving", Poster at VDI-VW Joint Conference 2018 "Autonomous Driving".

Office Action (Request for the Submission of an Opinion) issued Oct. 21, 2025, by the Korean Intellectual Property Office in corresponding Korean Patent Application No. 10-2023-7023997 and an English translation with the Concise Statement of Relevance of the Office Action. (14 pages).

Office Action (The First Office Action) issued Aug. 16, 2025, by the State Intellectual Property Office of People's Republic of China in corresponding Chinese Patent Application No. 202280013045.5 and an English translation of the Office Action. (21 pages).

Office Action (The Second Office Action) issued Feb. 24, 2026, by the State Intellectual Property Office of People's Republic of China in corresponding Chinese Patent Application No. 202280013045.5 and an English translation of the Office Action. (19 pages).

Office Action (Notice pursuant to Article 94(3) EPC) issued Apr. 2, 2026, by the European Patent Office in corresponding European Patent Application No. 22 709 172.5-1218 and an English machine translation of the Office Action. (12 pages).

Kochi University of Technology Remote Sensing Lecture Material, Chapter 7 two dimensional Measurement by Digital Image, [online], stored in Wayback Machine on Jun. 15, 2016, [acquired date] Apr. 17, 2026, acquired from <Wayback Machine, https://web.archive.org/web/20160615072944/https://www.infra.kochi-tech.ac.jp/takagi/RS_01/RS07.pdf (11 pages).

Office Action (Notice of Reasons for Refusal) issued May 20, 2026, by the Japan Patent Office in corresponding Japanese Patent Application No. 2023-542755 and an English translation of the Office Action. (12 pages).

Office Action (Decision to Rejection) issued May 14, 2026, by the State Intellectual Property Office of People's Republic of China in corresponding Chinese Patent Application No. 202280013045.5 and an English machine translation of the Office Action. (22 pages).

* cited by examiner

METHOD AND DEVICE FOR THE DETECTION AND DETERMINATION OF THE HEIGHT OF OBJECTS

CROSS-REFERENCE TO RELATED APPLICATIONS

The present application is a National Stage Application under 35 U.S.C. § 371 of International Patent Application No. PCT/DE2022/200009 filed on Jan. 27, 2022, and claims priority from German Patent Application No. 10 2021 201 713.4 filed on Feb. 24, 2021, in the German Patent and Trademark Office, the disclosures of which are herein incorporated by reference in their entireties.

TECHNICAL FIELD

The invention relates to a method as well as a device for the detection and determination of the height of objects in a vehicle environment.

BACKGROUND

Sensor systems, which can also detect small obstacles reliably at large distances, are required for highly automated driving. At present, LIDAR systems and stereo camera systems are being developed for this task since they offer the possibility of mapping the environment in 3D. Thus, the size and distance of the obstacles and the free space can be detected simultaneously. Stereo camera systems offer a significantly higher lateral resolution than LIDAR systems, whilst LIDAR systems allow very accurate distance determination. However, it is not possible to detect small objects over a long distance with the current solutions.

SUMMARY

Accordingly, it is an object of the present disclosure to provide a method as well as a system by means of which small objects can be reliably detected and the height of the objects can be reliably determined.

This object is achieved by the subject-matter of the independent claims 1 and 6. Advantageous configurations and embodiments are the subject-matter of the subclaims.

Initial considerations were that it is essential to accurately estimate the height of an object in order to be able to judge a danger due to small obstacles.

Previous stereo methods are predominantly based on the SGM (Semi Global Matching) method. Recently, machine learning methods based on deep neural networks, which are trained using ground truth data from LIDAR measurements, have also been increasingly used.

In order to be able to detect small objects of a height of 10 cm at a distance of 100 m, an angular resolution of at least 0.03 degrees is required. High-resolution LIDAR systems are still a factor of 3 to 6 above said value and are therefore not sufficiently suited to this task. High-resolution camera systems having 8 Mpix image sensors and a lens having a 30° aperture angle offer an angular resolution of 130 pixels/degree and map a 10 cm high object at a distance of 100 m on 8 pixels.

A stereo camera system having 2 high-resolution cameras could theoretically detect such a small object at a distance of 100 m. However, the signal noise in the depth map which is obtained from the stereo images is, as a general rule, too poor to irrefutably detect the object and, simultaneously, to also determine the height of the object.

According to the present disclosure, there is proposed a method for the detection and determination of the height of objects by means of an environment detection system, including a first environment detection sensor and a second environment detection sensor of a vehicle, wherein at least one of the environment detection sensors is a camera, the method including the following steps:

- capturing a mono image using the camera;
- capturing an environment representation using the second environment detection sensor;
- carrying out object detection in the mono image;
- carrying out object detection in the environment representation of the second environment detection sensor;
- measuring the distance from the object in the environment representation of the second environment detection sensor; and
- carrying out height determination of the detected object.

The camera may be a high-resolution telephoto camera. The camera has, for example, a resolution of 8 Mpix and an aperture angle of 30° as well as an angular resolution of 130 pixels/degree. The second environment detection sensor is, for example, a stereo camera. In this case, the environment detection system would be designed as a stereo camera and the mono camera may be a part of the stereo system in this configuration. It would also be conceivable to use a single mono camera and a separate stereo camera. In this configuration, the environment representation of the second environment detection sensor would be a depth image. It would also be conceivable to use a radar or lidar sensor as the second environment detection sensor. In the case of a radar sensor, the environment representation would be an object list or a radar signature list in which detected objects or radar signatures and the distances thereof from the vehicle are entered. The data can then be fused with the mono image. If a lidar sensor serves as the second environment detection sensor, the environment representation would be a point cloud. The singular is used for the object in the claims, to make them easier to read. However, it goes without saying that multiple objects can also be detected. It should further be noted that the two steps for object detection can take place simultaneously or after one another in any order. For example, the object detection can be carried out first in the environment representation of the second environment detection sensor and only then can the object be detected in the mono image. A reverse order or a simultaneous process would also be conceivable, as already indicated.

The detection of the object in the mono image indicates the size of the object in pixels. The distance from the object may be measured by means of the second environment detection sensor, in particular if the latter is a radar or a lidar sensor.

In a particular configuration, the height of the object is determined based on a height of the object in pixels in the mono image, the determined distance of the object as well as a known angular resolution of the environment detection sensor. The angular resolution of the respective sensors follows from the specific sensor data.

In a further configuration, the object detection is carried out in the mono image by means of a semantic segmentation based on a trained convolutional neural network CNN. This is advantageous since objects can be efficiently detected by means of the semantic segmentation, and not only can the detection of objects be improved by means of a correspondingly trained CNN, but also the shape of the object can be determined. The information can be helpful in order to specify whether it would be possible to drive over an object, if necessary, without damaging the vehicle.

In a configuration, after carrying out the object detections, the object is confirmed by means of a comparison of the mono image and the second environment representation. In this configuration, it is compared whether the positions of the detections correspond. If a correspondence exists in the comparison, the object is unequivocally confirmed.

In a particular embodiment, the object detection of one of the environment detection sensors further specifies a region of interest for the other environment detection sensor. That means that, for example, the object detection of the second environment detection sensor, for example by means of a radar sensor, specifies a region of interest (ROI) or a search area for the camera. Consequently, it is ensured that only the determined region in the mono image is examined for an object. This leads to a more efficient object detection. It would also be conceivable that the object detection in the mono image allows an increase in sensitivity in the radar search field. As a result, it can be ensured that very weak radar detections, for example, can be recognized as objects. Here as well, this leads to a more efficient and, above all, safer object detection.

According to the present disclosure, an environment detection system is further provided for a vehicle, comprising a first environment detection sensor and a second environment detection sensor having a determined angular resolution and a computing unit, wherein at least the first environment detection sensor is configured as a camera, wherein a mono image is captured using the camera and a further environment representation is captured using the second environment detection sensor, wherein the computing unit is configured to detect an object in the mono image as well as in the environment representation of the second environment detection sensor, wherein the computing unit is further configured to carry out distance determination as well as height determination of the object.

In a configuration, the first environment detection sensor is a telephoto camera and the second environment detection sensor is a stereo camera, a radar sensor or a lidar sensor.

If the second environment detection sensor is configured as a stereo camera, the telephoto camera is further a part of the stereo camera. The second environment detection sensor would consequently be the stereo camera and the first, as before, would be a mono camera. In this case, the stereo camera serves as a height-determining sensor by height determination in a depth image.

BRIEF DESCRIPTION OF THE DRAWINGS

Further advantageous configurations and embodiments are the subject-matter of the drawings, wherein.

DETAILED DESCRIPTION

Figure 1:
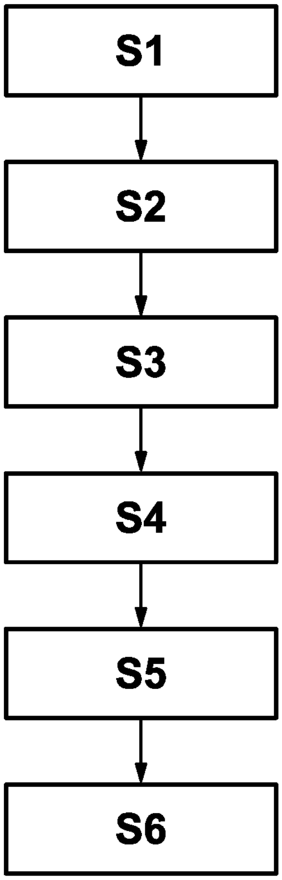
FIG. 1: shows a schematic flow chart of an embodiment of the method.

FIG. 1 shows a schematic flow chart of an example embodiment of the method for the detection and determination of the height of objects by means of a stereo detection system, including a first environment detection sensor and a second environment detection sensor of a vehicle, wherein at least one of the environment detection sensors is a mono camera. In step S1, a mono image is captured by means of the camera. In step S2, an environment representation is captured using the second environment detection sensor. In a subsequent step S3, object detection is carried out in the mono image. In a step S4, object detection is carried out in the environment representation of the second environment detection sensor. Steps S3 and S4 can be carried out after one another in any order, that is to say S4 before S3 or S3 before S4 or simultaneously. In step S5, distance determination from the object is carried out in the environment representation of the second environment detection sensor. Finally, height determination of the detected object is carried out in step S6.

Figure 2:
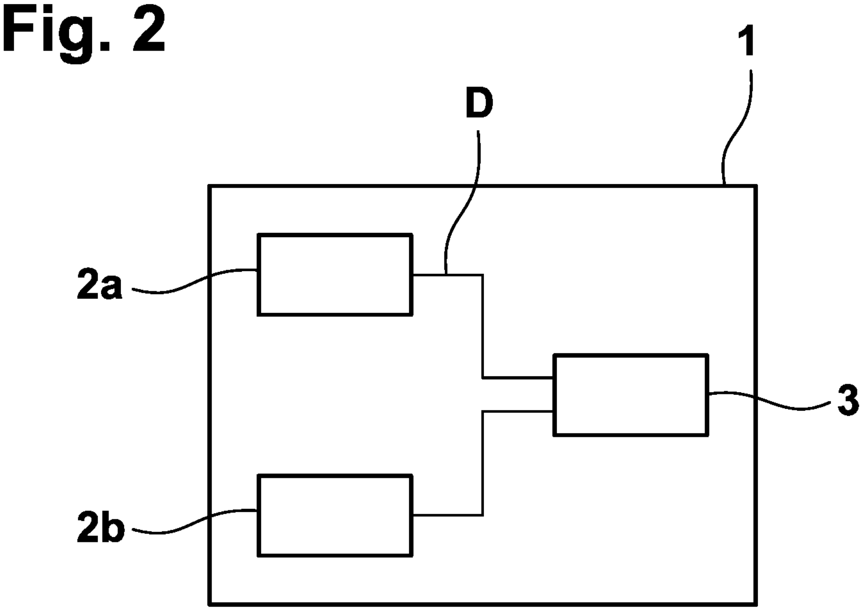
FIG. 2: shows a schematic representation of an environment detection system according to an embodiment of the present disclosure.

FIG. 2 shows a schematic representation of an environment detection system 1 according to an embodiment of the present disclosure. The environment detection system 1 includes a first environment detection sensor 2*a* which may be configured as a camera, and a second environment detection sensor 2*b*. These two environment detection sensors 2*a*, 2*b* are connected via a data link D to a computing unit 3. The computing unit 3 is configured to detect an object in the mono image, wherein the computing unit is further configured to carry out object detection in the mono image and the environment representation of the second environment detection sensor and wherein the computing unit is further configured to carry out distance determination as well as height determination of the object. The data link D can be configured to be wired or wireless.

Figure 3:
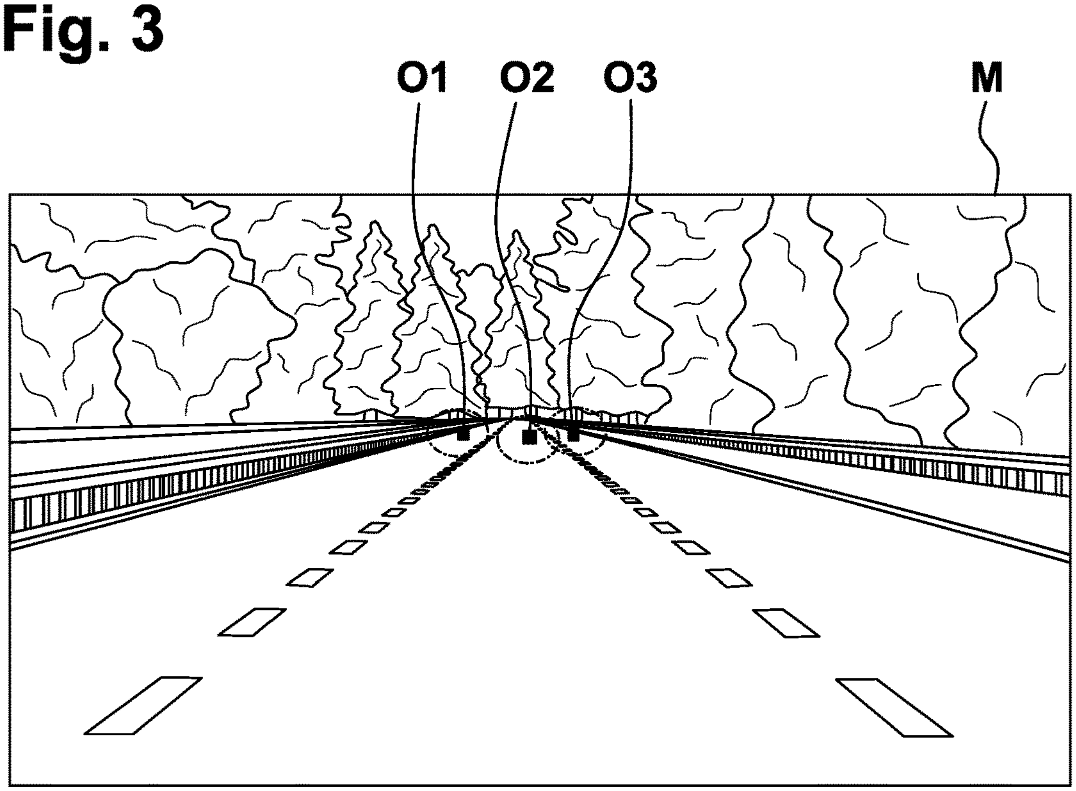
FIG. 3: shows a representation of an exemplary scene.

FIG. 3 shows a representation of an exemplary scene. In the representation, a section of a roadway is shown. Three objects O1, O2, O3 are located on the roadway. In this case, the representation is a mono image M. The objects O1, O2, O3 are detected in the mono image M, for example, by means of a semantic segmentation.

Figure 4:
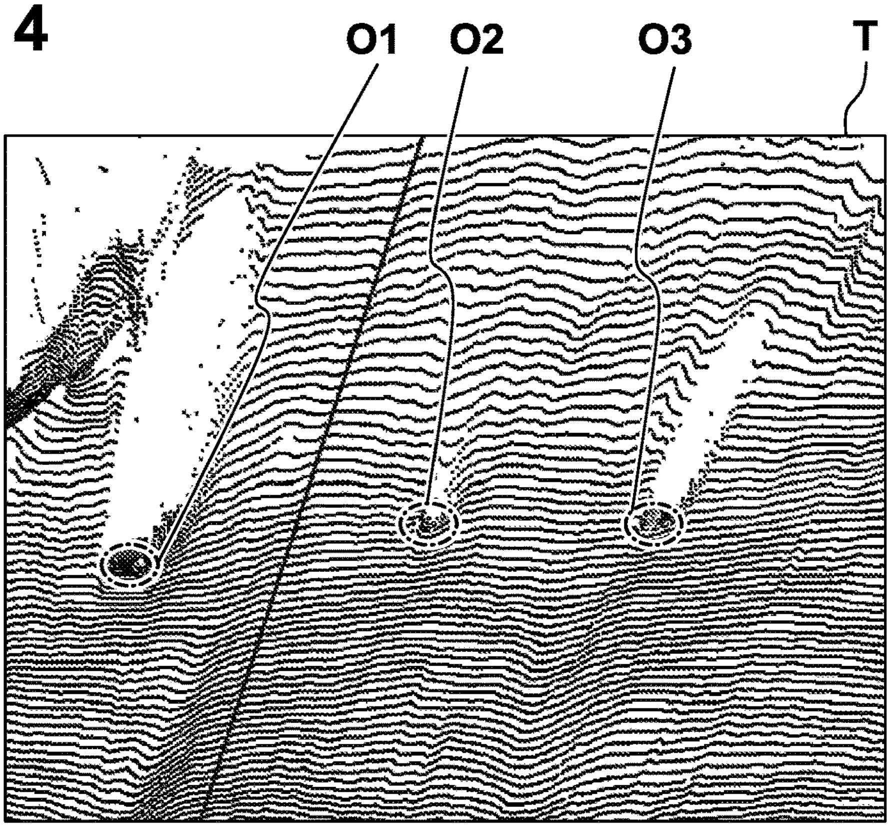
FIG. 4: shows an exemplary representation of a depth image from the scene depicted in FIG. 3.

FIG. 4 shows an exemplary representation of a depth image captured by means of a stereo camera from the scene depicted in FIG. 3. To this end, the second environment detection sensor is configured as a stereo camera. The objects O1, O2 and O3 are visible as elevations in the depth image T. The distance from the objects O1, O2, O3 can also be established in the depth image T.

LIST OF REFERENCE NUMERALS

1 Environment detection system
2*a* First environment detection sensor
2*b* Second environment detection sensor
3 Computing unit
D Data link
M Mono image
O1-O3 Objects
S1-S6 Method steps
T Depth image

The invention claimed is:

1. A method for detection and determination of a height of objects by means of an environment detection system, comprising a first environment detection sensor and a second environment detection sensor of a vehicle, wherein at least one of the environment detection sensors is a mono camera, the method comprising:

capturing a mono image using the mono camera;

capturing an environment representation using the second environment detection sensor;

carrying out, by a computing unit having a first input connected to an output of the first environment sensor and a second input connected to an output of the second environment sensor, object detection in the mono image;

carrying out, by the computing unit, object detection in the environment representation of the second environment detection sensor;

confirming, by the computing unit, a detected object by comparing the mono image and the second environment representation to determine whether a position of the detected object in the mono image corresponds to a position of the detected object in the second environment representation;

measuring, by the computing unit, a distance from a detected object in the environment representation of the second environment detection sensor;

carrying out, by the computing unit, height determination of the detected object and performing an automated driving operation for the vehicle based on the height of the detected object.

2. The method according to claim 1, wherein the height of the detected object is determined based on a height of the object in pixels in the mono image, the measured distance of the object as well as a known angular resolution of the environment detection sensors.

3. The method according to claim 1, wherein the object detection is carried out in the mono image by a semantic segmentation based on a trained convolutional neural network which is part of the computing unit.

4. The method according to claim 1, wherein the object detection for one of the environment detection sensors or specifies a region of interest for the objection detection for the other environment detection sensor.

5. An environment detection system for a vehicle, comprising a first environment detection sensor and a second environment detection sensor having a determined angular resolution and a computing unit, wherein at least the first environment detection sensor is configured as a camera, wherein a mono image is captured using the camera and a further environment representation is captured using the second environment detection sensor, wherein the computing unit includes a first input connected to an output of the first environment sensor and a second input connected to an output of the second environment sensor, wherein the computing unit is configured to detect an object in the mono image as well as in the environment representation of the second environment detection sensor, wherein the computing unit is further configured to, after the detection of an object in the mono image as well as in the environment representation, confirm a detected object by comparing the mono image and the second environment representation to determine whether a position of the detected object in the mono image corresponds to a position of the detected object in the environment representation of the second environment detection sensor, wherein the computing unit is further configured to carry out distance determination as well as height determination of the object for use in performing an automated driving operation of the vehicle.

6. The environment detection system according to claim 5, wherein the first environment detection sensor is a telephoto camera and the second environment detection sensor is a stereo camera, a radar sensor or a lidar sensor.

7. The environment detection system according to claim 6, wherein if the second environment detection sensor is configured as a stereo camera, the telephoto camera is a part of the stereo camera.

8. The environment detection system according to claim 5, wherein the height of the detected object is determined based on a height of the object in pixels in the mono image, the determined distance of the object as well as a known angular resolution of the environment detection sensors.

9. The environment detection system according to claim 5, wherein the object detection is carried out in the mono image by a semantic segmentation based on a trained convolutional neural network that is part of the computing unit.

10. The environment detection system according to claim 5, wherein the object detection for one of the environment detection sensors or specifies a region of interest for the objection detection for the other environment detection sensor.

* * * * *